US012720166B2

(12) United States Patent
Li et al.

(10) Patent No.: US 12,720,166 B2
(45) Date of Patent: Aug. 25, 2026

(54) INTERACTION METHOD, SYSTEM AND APPARATUS, AND NON-VOLATILE COMPUTER-READABLE STORAGE MEDIUM

(71) Applicant: Beijing Bytedance Network Technology Co., Ltd., Beijing (CN)

(72) Inventors: Chenguang Li, Beijing (CN); Xianhua Zeng, Beijing (CN); Lei Wang, Beijing (CN); Xuhong Zeng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 56 days.

(21) Appl. No.: 18/814,340

(22) Filed: Aug. 23, 2024

(65) Prior Publication Data

US 2024/0414411 A1 Dec. 12, 2024

Related U.S. Application Data

(63) Continuation of application No. PCT/CN2023/078096, filed on Feb. 24, 2023.

(30) Foreign Application Priority Data

Feb. 24, 2022 (WO) ................ PCT/CN2022/077560

(51) Int. Cl.
*H04N 21/63* (2011.01)
*H04N 21/266* (2011.01)

(52) U.S. Cl.
CPC ..... *H04N 21/632* (2013.01); *H04N 21/26613* (2013.01)

(58) Field of Classification Search
None
See application file for complete search history.

(56) References Cited

U.S. PATENT DOCUMENTS 6,981,045 B1 * 12/2005 Brooks .............. H04N 21/2343 709/246
2019/0089762 A1 3/2019 Singh et al.
2022/0094526 A1 * 3/2022 Irazabal ........... H04N 21/26613

FOREIGN PATENT DOCUMENTS

CN 110430551 A * 11/2019 ............ H04W 76/19

OTHER PUBLICATIONS

"QUIC Wire Layout Specification", Available online at: <https://docs.google.com/document/d/1WJvyZflAO2pq77yOLbp9NsGjC1CHetAXV8l0fQe-B_U/mobilebasic>, retrieved Nov. 15, 2024, 18 pages.
"QUIC, a multiplexed transport over UDP", The Chromium Projects, Available online at: <https://www.chromium.org/quic>, retrieved 2024, 2 pages.

(Continued)

*Primary Examiner* — Cai Y Chen
(74) *Attorney, Agent, or Firm* — Astute IP Law Group

(57) ABSTRACT

The present disclosure relates to the technical field of communications, and relates to an interaction method, system and apparatus, and a non-volatile computer-readable storage medium. The interaction method includes: performing media capability negotiation with a client according to a QUIC protocol; and establishing a P2P media transmission channel with the client, so as to transmit media data with the client by means of the P2P media transmission channel.

20 Claims, 10 Drawing Sheets

(56) References Cited

OTHER PUBLICATIONS

"Transmission Control Protocol", RFC 793, Darpa Internet Program, Prepared for Defense Advanced Research Projects Agency, Information Processing Techniques Office, 1400 Wilson Boulevard Arlington, Virginia 22209, by Information Sciences Institute University of Southern California, 4676 Admiralty Way, Marina del Rey, California 90291, Sep. 1981, 89 pages.

Begen et al., "SDP: Session Description Protocol", Internet Engineering Task Force (IETF), Request for Comments 8866, Standard Tracks, Jan. 2021, 46 pages.

Fielding et al., "Hypertext Transfer Protocol—HTTP_1.1", Network Working Group, Request for Comments 2616, Standards Track, Jun. 1999, 176 pages.

Hamilton et al., "QUIC: A UDP-Based Secure and Reliable Transport for HTTP/2 draft-tsvwg-quic-protocol-02", Network Working Group, Internet-Draft, Intended status: Informational, Jan. 2016, 37 pages.

International Search Report and Written Opinion for PCT/CN2023/078096, mailed on May 16, 2023, 11 pages.

Rosenberg, "Interactive Connectivity Establishment (ICE): A Protocol for Network Address Translator (NAT) Traversal for Offer/Answer Protocols", Internet Engineering Task Force (IETF), Request for Comments 5245, Obsoletes: 4091, 4092, Category: Standards Track, Apr. 2010, 117 pages.

S. Dawkins, "SDP Offer/Answer for RTP using QUIC as Transport", IETF draft-dawkins-sdp-rtp-quic-00, 08, Sep. 8, 2021, 10 pages.

Schulzrinne et al., "RTP: A Transport Protocol for Real-Time Applications", Network Working Group, Request for Comments 3550, Obsoletes: 1889, Category: Standards Track, Jul. 2003, 104 pages.

* cited by examiner

INTERACTION METHOD, SYSTEM AND APPARATUS, AND NON-VOLATILE COMPUTER-READABLE STORAGE MEDIUM

CROSS-REFERENCE TO RELATED APPLICATIONS

The present application is a Continuation of International Application No. PCT/CN2023/078096, filed on Feb. 24, 2023, which claims priority to Chinese Application No. PCT/CN2022/077560, filed on Feb. 24, 2022, the contents of which are hereby incorporated by reference in their entireties.

TECHNICAL FIELD

The present disclosure relates to the technical field of communications, and in particular, to an interaction method, system and apparatus, and a non-volatile computer-readable storage medium.

BACKGROUND

When live streaming was just emerging, there were fewer interaction sessions during live streaming, and the atmosphere of a live streaming room is controlled by a live streamer unilaterally. Therefore, a latency of more than ten seconds has less impact on the user experience. For most of the common live streaming, RTMP, HLS, and FLV protocols are employed, which have the advantages of being technically mature, providing good compatibility, and supporting for large-scale concurrency, etc.

However, an end-to-end latency can only be controlled at a minimum of 4 to 6 seconds, which reduces the interactive experience during live streaming, and also hinders the implementation and promotion of live streaming in some scenarios, and thus fails to facilitate the prosperity of a live streaming application ecosystem.

With the accelerated development of a “live+” mode in various industries, e-commerce live streaming, online classroom, sport events, interactive entertainment, and other diversified interactive live streaming have emerged, making users more demanding in real-time interactivity, and live streaming then enters an era of millisecond-order end-to-end latency.

Low-latency live streaming technologies (based on peer-to-peer transmission) in the related art are all derived from WebRTC technology. Steps of creating peer-to-peer transmission based on a WebRTC standard are described below. As shown in FIG. 1, the main steps are as follows.

In step 1, two communication parties need to perform a media negotiation for interaction, which is based on a session description protocol (SDP). For example, step 1 is a signaling interaction process, and a typical live push stream/playback request is called a valid session. Before transmission of live streaming media data, both sides of the transmission (a client/server) need to identify transmission and processing capabilities of both sides for audio and video media, such as supported formats, processing details of codec, and processing modes for quality assurance. In order to solve the problem of unequal capabilities between members (the client/server) participating in the session, to ensure compatibility, low-latency live streaming uses an SDP to first perform a media capability session negotiation to communicate media capabilities common to each other so that subsequent transmission requirements are met.

In step 2, an interactive network address negotiation (for querying a real IP address of the peer side) is then performed to prepare for the creation of a media transport channel.

In step 3, when the above conditions are ready, final peer to peer media data transmission is started.

For example, step 3 is a media transmission process, and when the session negotiation is finished, the media data transmission is started. Media data contains audio and video data of a live push/pull stream. The audio and video data are transmitted based on a user datagram protocol (UDP) in an unreliable manner and in combination with QoS means such as congestion control/packet loss detection and recovery, so as to complete media stream transmission and delivery (based on the WebRTC technology). The entire process of signaling interaction/media negotiation/media transmission is a valid session in the low-latency live streaming. Live push streaming (a live streamer side sends media audio and video data to the server) and live pull streaming (a viewer side requests media audio and video data from the server) are both one-way media data transmission, which is different from full duplex two-way audio and video transmission in a video call mode.

In the related art, a MiniSDP protocol is employed. For the protocol negotiation, the traditional SDP has larger offer and answer packets, which makes it inconvenient for transmission. The MiniSDP performs byte compression on an offer SDP and an answer SDP, with a compression ratio up to 10 times, from several kilobytes to several hundred bytes (making transmission available with one RTP packet), thereby improving the transmission efficiency.

In the related art, HTTP signaling is employed for interaction. For the signaling interaction process in step 1 of FIG. 1, as shown in FIG. 2, the client transmits the generated offer SDP to a signaling server via an HTTP request. The signaling server returns a corresponding answer SDP. The HTTP signaling is transmitted over an TCP. TCP requires a three-way handshake, which takes a longer time to establish a link, and there is no security authentication mechanism.

In the related art, UDP signaling is employed for interaction. For the signaling interaction process in step 1 of FIG. 1, as shown in FIG. 3, the UDP signaling transmits the offer to the signaling server via a UDP packet. Compared with the HTTP signaling, the UDP packet request does not require a handshake. Therefore, the UDP signaling has a higher transmission efficiency than the HTTP signaling in some scenarios. However, the UDP packet is transmitted unreliably, which can not guarantee the integrity of the transmission of the packet, and there is no security authentication mechanism.

SUMMARY

According to some embodiments of the present disclosure, there is provided an interaction method. The method comprises: computing, by a client, a symmetric key of a client using a public key of a server, and encrypting a session description protocol offer (offer SDP) with the symmetric key of the client; performing, by the server, back-to-source of media data based on the received encrypted offer SDP, to generate a session protocol offer answer (answer SDP); and computing, by the server, a symmetric key of the server, and encrypting the answer SDP with the symmetric key of the server and then returning same to the client.

In some embodiments, the interaction method further comprises: in the case of a quick UDP Internet connection (QUIC) protocol initial connection, asking, by the client, the server for the public key; and returning, by the server, the public key of the server to the client.

In some embodiments, the encrypting a session description protocol offer (offer SDP) with the symmetric key of the client comprises: compressing, by the client, the offer SDP into a miniSDP; and encrypting the miniSDP with the symmetric key of the client.

In some embodiments, the interaction method further comprises: obtaining, by the client, an IP address of a signaling server.

In some embodiments, the interaction method further comprises: in the case of the QUIC initial connection, returning, by the server, a first public key of the server, a certificate of the server, and a random number of the server; and verifying, by the client, the certificate of the server, and returning, to the server, a public key of the client and a random number of the client.

In some embodiments, the computing a symmetric key of the server comprises: generating, by the server, a second public key of the server, to compute the symmetric key of the server.

According to some other embodiments of the present disclosure, there is provided an interaction system. The system comprises: a client configured to compute a symmetric key of a client using a public key of a server, and encrypt a session description protocol offer (offer SDP) with the symmetric key of the client; and a server configured to perform back-to-source of media data based on the received encrypted offer SDP to generate a session protocol offer answer (answer SDP), compute a symmetric key of the server, and encrypt the answer SDP with the symmetric key of the server and then return same to the client.

According to some other embodiments of the present disclosure, there is provided an interaction method, which is performed by a client. The method comprises: computing a symmetric key of the client; and sending, to a server, a public key of the client and capability information of the client that is encrypted with the symmetric key of the client.

In some embodiments, the interaction method further comprises: in the case of an initial connection between the client and the server, asking the server for a first public key of the server; and receiving the first public key of the server that is returned by the server, where the first public key is configured to compute the symmetric key of the client.

In some embodiments, the computing the symmetric key of the client using the first public key of the server comprises: in the case of a non-initial connection between the client and the server, computing the symmetric key of the client using a saved first public key of the server.

In some embodiments, the capability information of the client comprises a mini session description protocol (miniSDP). The interaction method further comprises: compressing a session description protocol offer (offer SDP) into the miniSDP.

In some embodiments, the capability information of the client is generated through compression of an offer SDP by the client. The interaction method further comprises: decompressing the capability information of the client into the offer SDP.

In some embodiments, the capability information of the client comprises a miniSDP.

In some embodiments, the interaction method further comprises: receiving a second public key of the server and capability information of the server that is encrypted with a symmetric key of the server, which are returned by the server, where the symmetric key of the server is computed by the server based on the generated second public key of the server.

In some embodiments, the capability information of the server is a mini session description protocol answer (miniSDP answer), where the miniSDP answer is generated through compression of a session description protocol answer (SDP answer) by the server. The interaction method further comprises: decompressing the miniSDP answer to obtain the SDP answer.

In some embodiments, the capability information of the server is generated through compression of the session description protocol answer (SDP answer), and the returning, to the client, a second public key of the server and the capability information of the server that is encrypted with a symmetric key of the server comprises: compressing the SDP answer into the capability information of the server; and returning the encrypted capability information of the server to the client.

In some embodiments, the capability information of the server comprises a mini session description protocol answer (miniSDP answer).

In some embodiments, the capability information of the server is generated from media information that is found by the server by performing back-to-source of the media data based on the capability information of the client.

In some embodiments, the interaction method further comprises: in the case of the initial connection between the client and the server, verifying a certificate returned by the server.

In some embodiments, the interaction method further comprises: sending a mini session description protocol data buffer (MiniSDP data buffer) over an established quick user datagram protocol Internet connection (QUIC) channel.

In some embodiments, the computing a symmetric key of the client comprises: computing the symmetric key of the client using the first public key of the server and a private key of the client.

According to still other embodiments of the present disclosure, there is provided an interaction method, which is performed by a server. The method comprises: receiving, from a client, a public key of the client and capability information of the client that is encrypted with a symmetric key of the client; and obtaining the capability information of the client.

In some embodiments, the interaction method further comprises: in the case of an initial connection between the client and the server, receiving, from the client, a query about a first public key of the server; and returning the first public key of the server to the client, where the first public key is configured to compute the symmetric key of the client.

In some embodiments, the capability information of the client is a mini session description protocol (miniSDP), where the miniSDP is generated through compression of a session description protocol offer (offer SDP) by the client. The interaction method further comprises: decompressing the miniSDP into the offer SDP.

In some embodiments, the interaction method further comprises: compressing a session description protocol offer (offer SDP) into the capability information of the client.

In some embodiments, the capability information of the client comprises a mini session description protocol (miniSDP).

In some embodiments, the interaction method further comprises: returning, to the client, a second public key of the server and capability information of the server that is encrypted with a symmetric key of the server, where the symmetric key of the server is computed by the server based on the generated second public key of the server.

In some embodiments, the capability information of the server comprises a mini session description protocol answer (miniSDP answer), and the returning, to the client, a second public key of the server and capability information of the server that is encrypted with a symmetric key of the server comprises: compressing a session description protocol answer (SDP answer) into the miniSDP answer; and returning the encrypted miniSDP answer to the client.

In some embodiments, the capability information of the server is generated through compression of a session description protocol answer (SDP answer) by the server. The interaction method further comprises: decompressing the capability information of the server, to obtain the SDP answer.

In some embodiments, the capability information of the server comprises a mini session description protocol answer (miniSDP answer).

In some embodiments, the interaction method further comprises: performing back-to-source of the media data based on the capability information of the client, to find media information; and generating the capability information of the server based on the media information.

In some embodiments, the interaction method further comprises: in the case of the initial connection between the client and the server, returning a certificate to the client for verification of the certificate by the client.

In some embodiments, the interaction method further comprises: over an established QUIC channel, receiving a MiniSDP data buffer sent by the client.

In some embodiments, the symmetric key of the client is computed by the client using the first public key of the server and a private key of the client.

According to still other embodiments of the present disclosure, there is provided an interaction method, which is performed by a server. The method comprises: performing a media capability negotiation with a client according to a QUIC protocol; and establishing a peer-to-peer (P2P) media transport channel with the client for transmission of media data with the client through the P2P media transport channel.

In some embodiments, the performing the media capability negotiation with the client according to the quick user datagram protocol Internet connection (QUIC) protocol comprises: receiving, from the client, a public key of the client and capability information of the client that is encrypted with a symmetric key of the client; and obtaining the capability information of the client.

In some embodiments, the establishing a peer-to-peer (P2P) media transport channel with the client for transmission of media data with the client through the P2P media transport channel comprises: establishing the P2P connection by means of an ICE protocol for transmission of the media data.

According to still other embodiments of the present disclosure, there is provided an interaction method, which is performed by a client. The method comprises: performing a media capability negotiation with a server according to a QUIC protocol; and establishing a peer-to-peer (P2P) media transport channel with the client for transmission of media data with the client through the P2P media transport channel.

In some embodiments, the performing the media capability negotiation with the server according to the quick user datagram protocol Internet connection (QUIC) protocol comprises: computing a symmetric key of the client; and sending, to the server, a public key of the client and capability information of the client that is encrypted with the symmetric key of the client.

In some embodiments, the establishing a peer-to-peer (P2P) media transport channel with the client for transmission of media data with the client through the P2P media transport channel comprises: establishing the P2P connection by means of an ICE protocol for transmission of the media data.

According to still other embodiments of the present disclosure, there is provided an interaction system. The system comprises: a client configured to perform the interaction method at a client side in any one of the foregoing embodiments; and a server configured to perform the interaction method at a server side in any one of the foregoing embodiments.

According to still other embodiments of the present disclosure, there is provided a computer-readable storage medium having a computer program stored thereon, where when the program is executed by a processor, the interaction method according to any of the foregoing embodiments is implemented.

According to some embodiments of the present disclosure, there is further provided a computer program comprising instructions that, when executed by a processor, cause the processor to perform the interaction method according to any one of the foregoing embodiments.

According to some embodiments of the present disclosure, there is further provided a non-volatile computer program product comprising instructions that, when executed by a processor, cause the processor to perform the interaction method in any one of the foregoing embodiments.

From the following detailed description of exemplary embodiments of the present disclosure with reference to the accompanying drawings, other features and advantages of the present disclosure will become clear.

BRIEF DESCRIPTION OF THE DRAWINGS

The accompanying drawings illustrated here are used to provide a further understanding of the present disclosure and constitute a part of the present application, and the illustrative embodiments of the present disclosure and the description thereof are used to explain the present disclosure and do not constitute improper limitations on the present disclosure. In the accompanying drawings.

DETAILED DESCRIPTION

Figure 1:
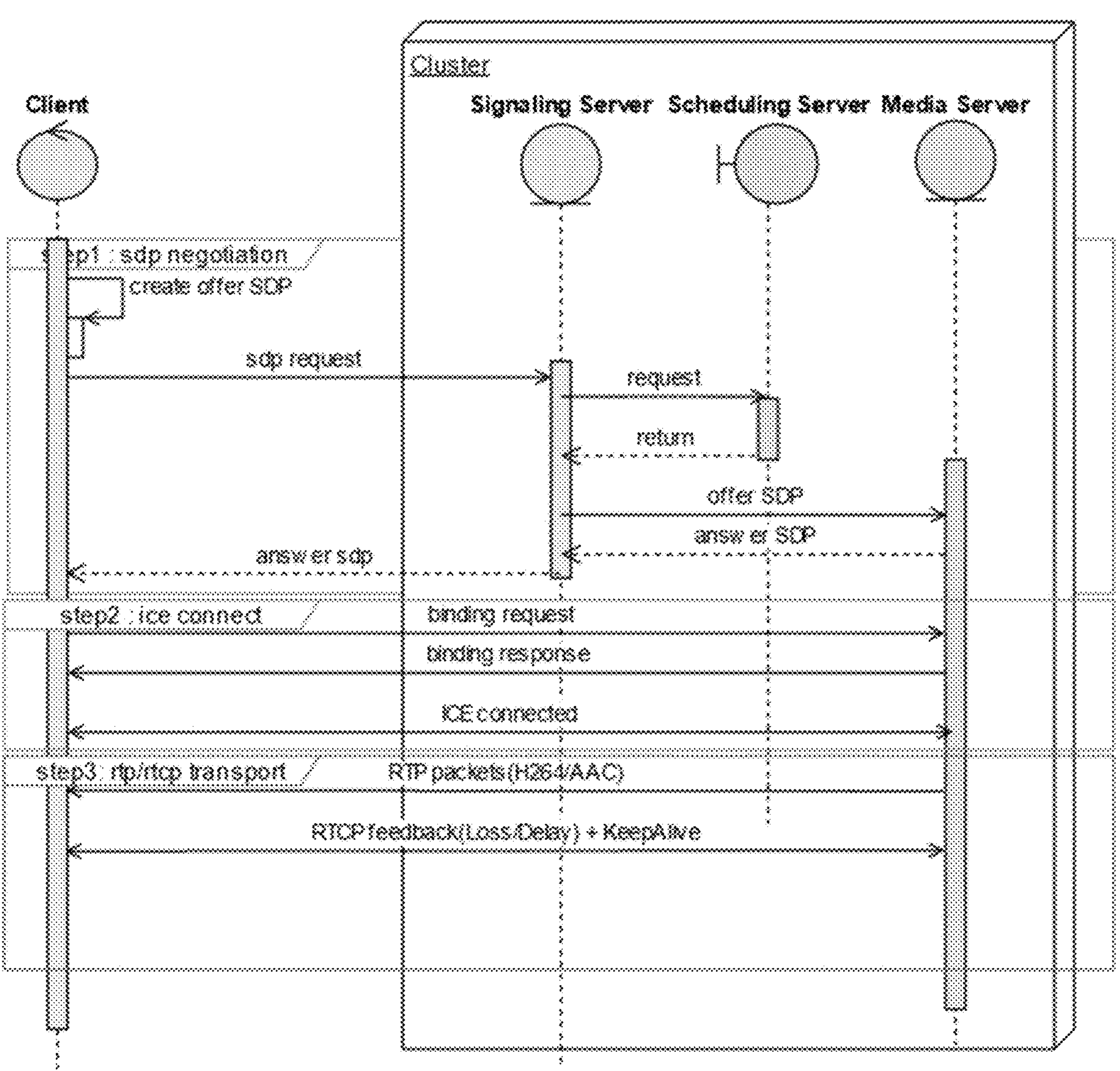
FIG. 1 to FIG. 3 are signaling diagrams in the related art.
Figure 2:
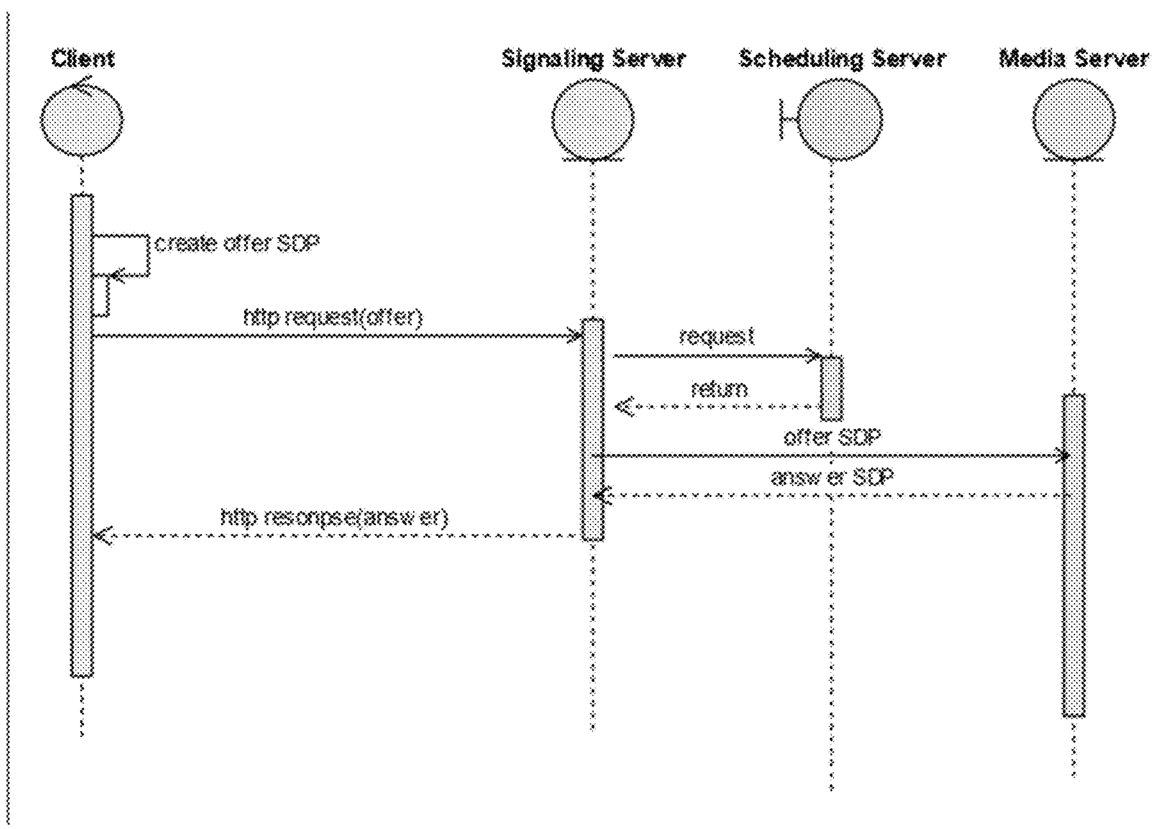
Figure 3:
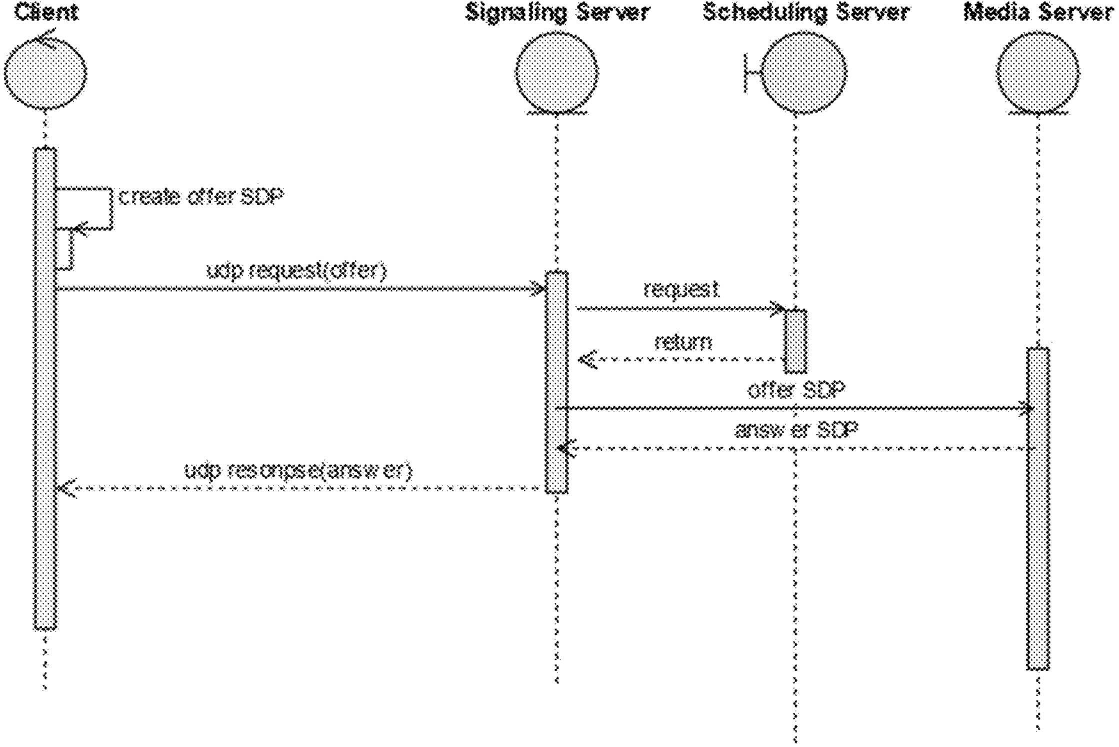

The technical solutions in the embodiments of the present disclosure are clearly and completely described below with reference to the drawings of the embodiments of the present disclosure. However, apparently, the embodiments described are merely some embodiments of the present disclosure rather than all the embodiments. The following description of at least one exemplary embodiment is actually illustrative only, and in no way serves as any limitation to the present disclosure and application or use thereof. All the other embodiments obtained by those of ordinary skill in the art based on the embodiments of the present disclosure without any creative effort shall fall within the scope of protection of the present disclosure.

Unless specifically stated otherwise, the relative arrangement of components and steps, numerical expressions, and numerical values set forth in these embodiments do not limit the scope of the present disclosure. Also, it should be understood that, for ease of description, the sizes of various parts shown in the drawings are not drawn to actual scale. Technologies, methods, and devices known to those skilled in the art may not be discussed in detail, but where appropriate, such technologies, methods, and devices should be considered as part of the authorized specification. In all examples shown and discussed here, any specific value should be interpreted as merely illustrative and not as limitations. Therefore, there may be different values in other examples of an exemplary embodiment. It should be noted that similar reference signs and letters refer to similar items in the following accompanying drawings. Therefore, once a specific item is defined in one of the accompanying drawings, it need not be further discussed in subsequent accompanying drawings.

In the related art, the technical problems are as follows. The standardized SDP signaling over HTTP/HTTPS transmission provides the best support for a CDN, but takes the longest time for signaling connection establishment and has a low success rate under weak network conditions; and over UDP transmission, the time for connection establishment can be shortened, but more packets need to be transmitted in the signaling process in the case of a larger SDP offer packet, and the success rate is also easily affected under weak network conditions. In addition, both HTTP and UDP signaling lack a security authentication mechanism, and thus cannot be used in specific scenarios. QUIC signaling interaction can take into account respective advantages of HTTP and UDP signaling, and supports a security authentication mechanism. The QUIC signaling interaction can provide a more reliable and efficient transmission service in a low-latency live streaming scenario.

For the above technical problems, the present disclosure makes it possible to create peer-to-peer transmission based on a QUIC signaling interaction process, to implement low-latency live streaming.

In some embodiments, similar to TCP+TLS+HTTP/2, QUIC provides secure and reliable transmission, that is, stream (H2)-based multiplexing, based on UDP transmission. Unlike TCP implemented by an operating system, the entire QUIC can be implemented in an open-source and controllable manner. The present disclosure can support the existing QUIC signaling standard and later updated versions thereof, and also support other signaling standards based on the principle of the QUIC signaling standard, which is not limited here.

Figure 4:
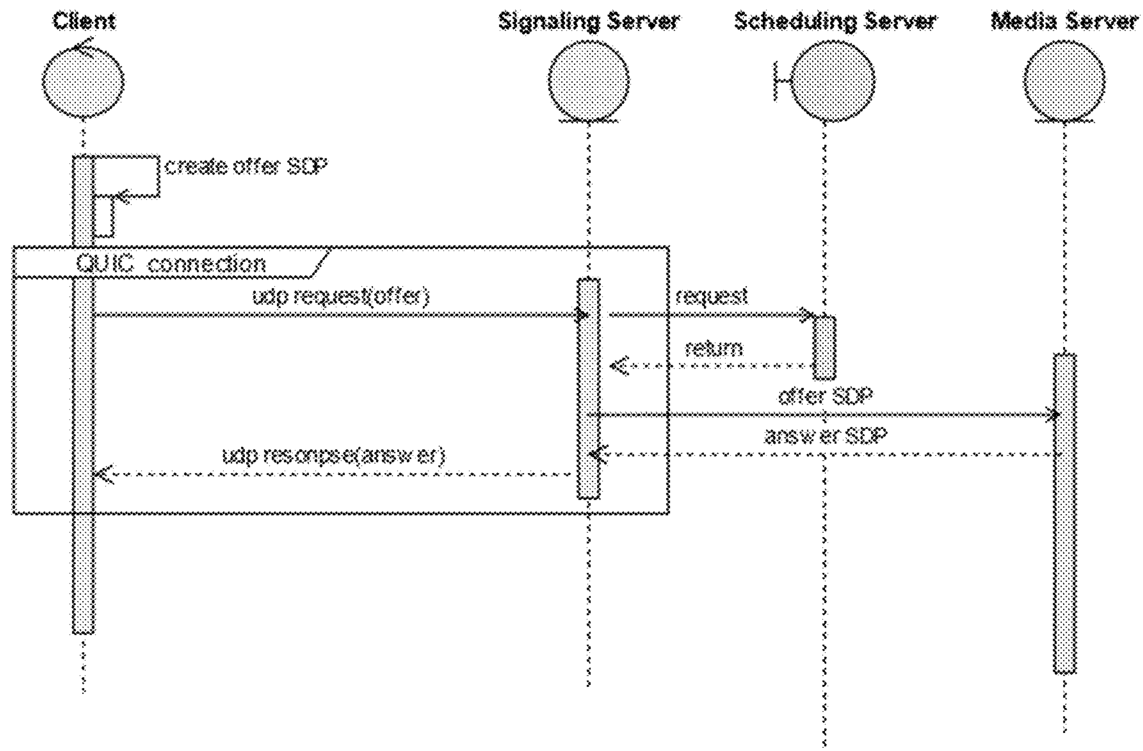
FIG. 4 is a signaling diagram of an interaction method according to some embodiments of the present disclosure.

The signaling interaction process of step 1 in FIG. 1 may be implemented based on QUIC and according to the embodiment in FIG. 4.

In some embodiments, an SDP over QUIC signaling interaction procedure may be implemented. Based on the QUIC signaling interaction process, there are two scenarios, namely, a QUIC initial connection and a QUIC non-initial connection.

Figure 5:
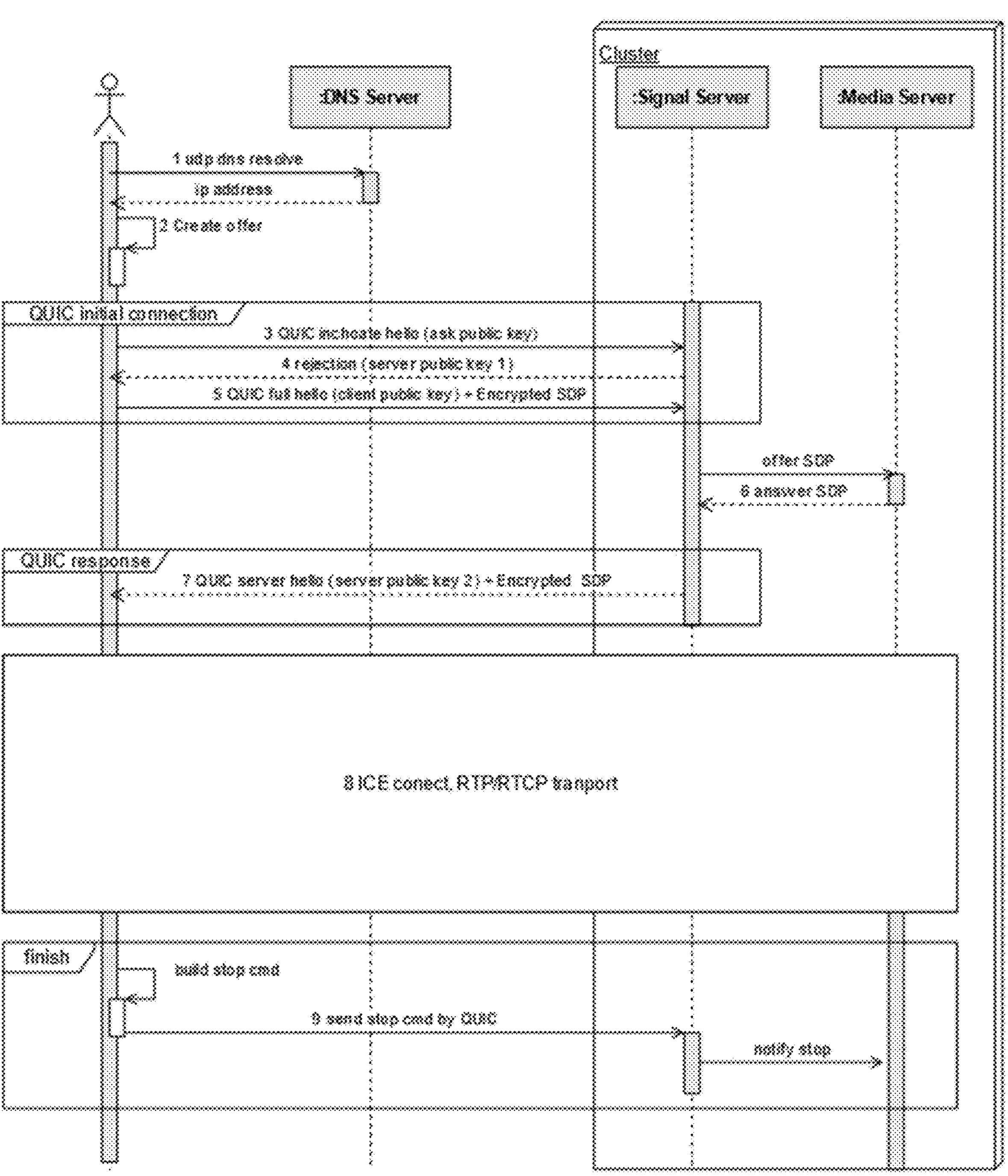
FIG. 5 is a signaling diagram of a QUIC initial connection (1-RTT-signaling) according to some embodiments.

FIG. 5 shows some embodiments of the QUIC initial connection (1-RTT-signaling).

As shown in FIG. 5, in step 1, an initial signaling phase (corresponding to step 1 of FIG. 1) comprises:

1. obtaining an IP address of a signaling server;
2. generating an offer SDP by a client;
3. sending, by the client, inchoate hello to the server, and asking for a public key of the server;
4. returning, by the server, rejection along with the public key, a certificate, and a random number of the server;
5. verifying, by the client, the certificate and computing a symmetric key K1; sending full hello along with a public key and a random number of the client as well as an offer SDP encrypted with the symmetric key K1; and sending, using an HTTP/1.1 POST method, a MiniSDP data buffer over an established QUIC channel (SDP over QUIC);
6. performing, by the server, back-to-source of media data based on a standard SDP, to find media information of audio and a video, so as to generate a standard answer SDP; and
7. generating, by the server, a temporary server public key 2, computing a forward-secure symmetric key K2, and returning server hello and an answer SDP encrypted with the symmetric key K2.

It should be understood that the steps in step 1 can have an add-on step, and can be split, deleted, or merged, to complete similar functions, which is not limited in the present disclosure.

In step 2, a media data transmission phase (corresponding to steps 2 and 3 of FIG. 1, which are not described in detail here) comprises:

8. following a traditional peer-to-peer (P2P) connection establishment procedure (comprising ICE and RTP/RTCP transmission).

In step 3, a signaling end phase comprises:

9. sending stop information to the signaling server, to end the connection. Compared with the technology in FIG. 1, a stop process is added for timely release of resources. It should be understood that this step is an optional step.

Figure 6:
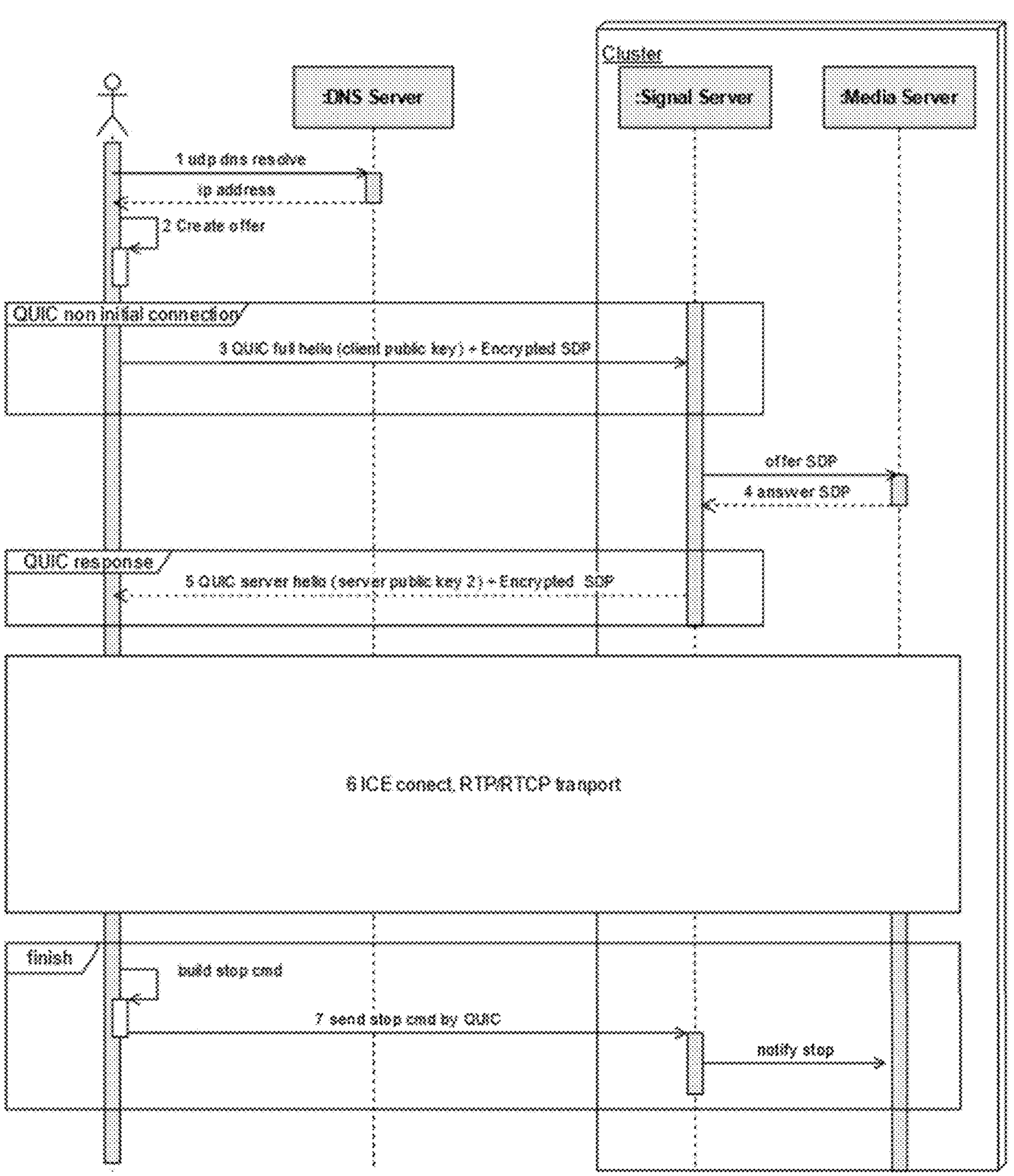
FIG. 6 is a signaling diagram of a QUIC non-initial connection (0-RTT-signaling) according to some embodiments.

FIG. 6 shows some embodiments of a QUIC non-initial connection (0-RTT-signaling).

As shown in FIG. 6, in step 1, an initial signaling phase (corresponding to step 1 of FIG. 1) comprises:

1. obtaining an IP address of a signaling server;
2. generating an offer SDP by a client;
3. sending, by the client, full hello along with a public key and a random number of the client as well as an SDP offer (SDP over QUIC) encrypted with a symmetric key K1 computed from a saved server config (comprising a server public key);
4. performing, by a server, back-to-source of media data based on a standard SDP, to find media information of audio and a video, so as to generate a standard answer SDP; and 5. generating, by the server, a temporary server public key 2, computing a forward-secure symmetric key K2, and returning server hello and an SDP answer encrypted with the symmetric key K2. It should be understood that the steps in step 1 can have an add-on step, and can be split, deleted, or merged, to complete similar functions, which is not limited.

In step 2, a media data transmission phase (corresponding to steps 2 and 3 of FIG. 1, which are not described in detail here) comprises:

6. according to a traditional P2P connection establishment procedure, starting real-time transport protocol (RTP) data transmission, at which playback is started.

In step 3, a signaling end phase comprises:

7. sending stop information to the signaling server, to end the connection for timely release of resources. It should be understood that this step is an optional step.

In some embodiments, a MiniSDP over QUIC signaling interaction procedure may be implemented. To further improve the transmission efficiency of SDP, an SDP compression technique (Mini SDP) is employed. The procedure is similar to the SDP over QUIC signaling interaction procedure, except that a transition procedure from the standard SDP to a Mini SDP and from the Mini SDP to the standard SDP is added for the client and the server. Also, there are an initial connection process and a non-initial connection process.

Figure 7:
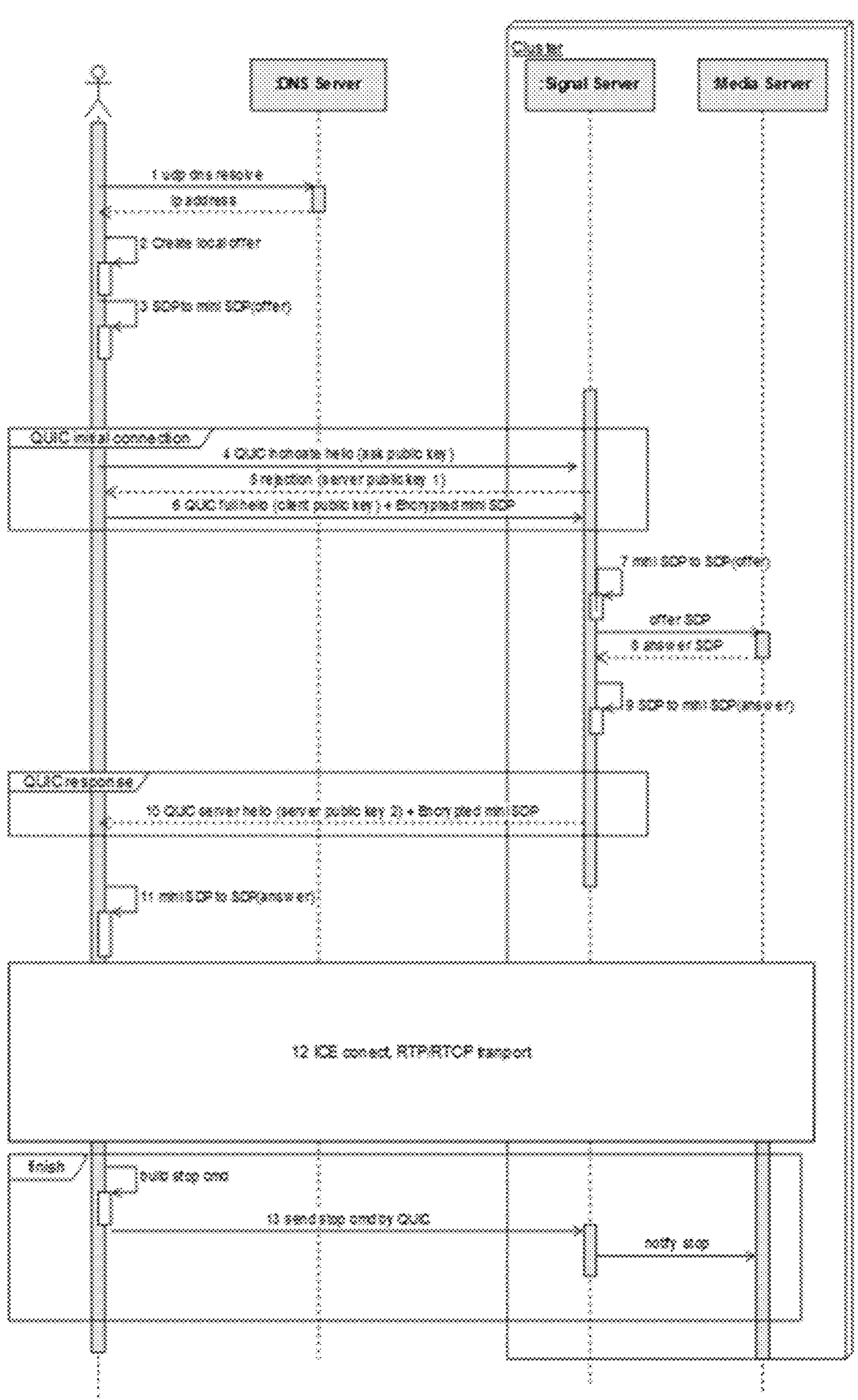
FIG. 7 is a signaling diagram of a QUIC initial connection (1-RTT-signaling) according to some embodiments.

FIG. 7 shows some embodiments of a QUIC initial connection (1-RTT-signaling).

As shown in FIG. 7, in step 1, an initial signaling phase (corresponding to step 1 of FIG. 1) comprises:

1. obtaining an IP address of a signaling server;
2. generating an offer SDP by a client;
3. compressing, by the client, a standard SDP into a MiniSDP according to a specified protocol;
4. sending, by the client, inchoate hello to a server, and asking for a public key of the server;
5. returning, by the server, rejection along with the public key, a certificate, and a random number of the server;
6. verifying, by the client, the certificate and computing a symmetric key K1, sending full hello along with a public key and a random number of the client as well as a MiniSDP offer encrypted with the symmetric key K1, and sending, using an HTTP/1.1 POST method, a MiniSDP data buffer over an established QUIC channel (MiniSDP over QUIC);
7. receiving, by the server, an answer from the client again, and decompressing the received MiniSDP into the standard SDP according to a specified protocol;
8. performing, by the server, back-to-source of media data based on the standard SDP, to find media information of audio and a video, so as to generate a standard answer SDP; and
9. compressing, by the server, the standard SDP into the MiniSDP according to the specified protocol;
10. generating, by the server, a temporary server public key 2, computing a forward-secure symmetric key K2, and returning server hello and a MiniSDP answer encrypted with the symmetric key K2; and
11. decompressing, by the client, the MiniSDP into the standard SDP according to the specified protocol. It should be understood that the steps in step 1 can have an add-on step, and can be split, deleted, or merged, to complete similar functions, which is not limited in the present disclosure.

In step 2, a media data transmission phase (corresponding to steps 2 and 3 of FIG. 1, which are not described in detail here) comprises:

12. according to a traditional P2P connection establishment procedure, starting RTP data transmission, at which playback is started.

In step 3, a signaling end phase comprises:

13. sending stop information to the signaling server, to end the connection for timely release of resources. It should be understood that this step is an optional step.

Figure 8:
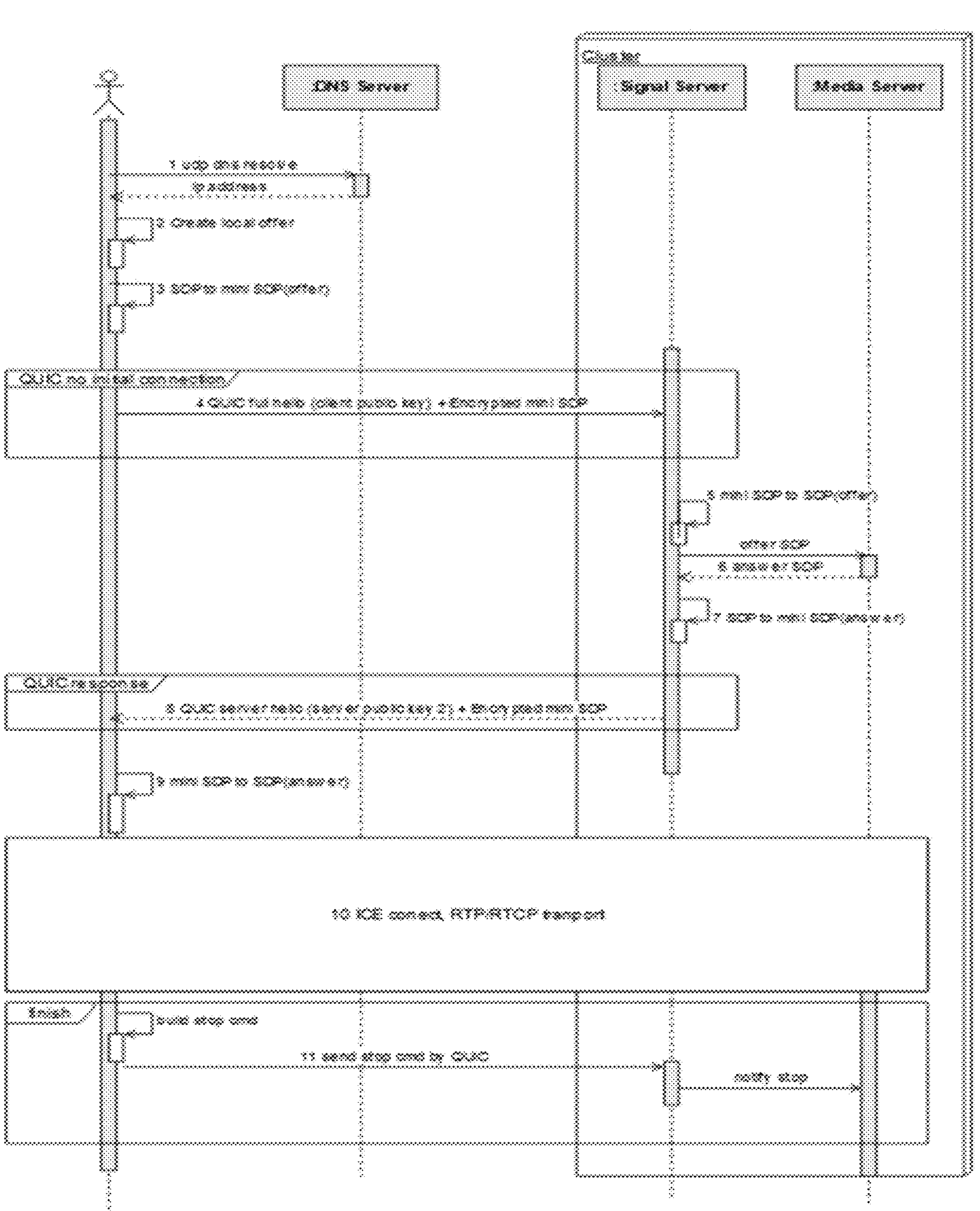
FIG. 8 is a signaling diagram of a QUIC non-initial connection (0-RTT-signaling) according to some embodiments.

FIG. 8 shows some embodiments of a QUIC non-initial connection (0-RTT-signaling).

As shown in FIG. 8, in step 1, an initial signaling phase (corresponding to step 1 of FIG. 1) comprises:

1. obtaining an IP address of a signaling server;
2. generating an offer SDP by a client;
3. compressing, by the client, a standard SDP into a MiniSDP according to a specified protocol;
4. sending, by the client, full hello along with a public key and a random number of the client as well as a MiniSDP offer (MiniSDP over QUIC) encrypted with a symmetric key K1 computed from a saved server config (comprising a server public key);
5. receiving, by a server, an answer from the client again, and decompressing the received MiniSDP into the standard SDP according to a specified protocol;
6. performing, by the server, back-to-source of media data based on the standard SDP, to find media information of audio and a video, so as to generate a standard answer SDP; and
7. compressing, by the server, the standard SDP into the MiniSDP according to the specified protocol;
8. generating, by the server, a temporary server public key 2, computing a forward-secure symmetric key K2, and returning server hello and a MiniSDP answer encrypted with the symmetric key K2; and
9. decompressing, by the client, the MiniSDP into the standard SDP according to the specified protocol. It should be understood that the steps in step 1 can have an add-on step, and can be split, deleted, or merged, to complete similar functions, which is not limited.

In step 2, a media data transmission phase (corresponding to steps 2 and 3 of FIG. 1, which are not described in detail here) comprises:

10. according to a traditional P2P connection establishment procedure, starting RTP data transmission, at which playback is started.

In step 3, a signaling end phase comprises:

11. sending stop information to the signaling server, to end the connection for timely release of resources. It should be understood that this step is an optional step.

In the above embodiments, the signaling interaction process between the client and the server under the low-latency live streaming is completed by means of the QUIC+SDP/MiniSDP protocols. As a reliable transmission protocol, QUIC can implement a reliable transmission function as is the case with HTTP, and can also achieve high-efficient UDP transmission in certain scenarios for the non-initial connection; in addition, QUIC is provided with the security authentication mechanism, which effectively improves the security of the signaling process.

Figure 9:
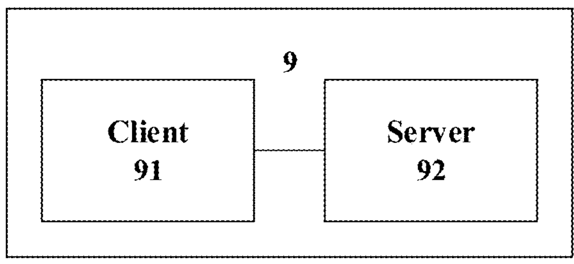
FIG. 9 is a block diagram of an interaction system according to some embodiments of the present disclosure.

FIG. 9 is a block diagram of an interaction system according to some embodiments of the present disclosure.

As shown in FIG. 9, an interaction system 9 comprises: a client 91 configured to compute a symmetric key of a client using a public key of a server, and encrypt a session description protocol offer (offer SDP) with the symmetric key of the client; and a server 92 configured to perform back-to-source of media data based on the received encrypted offer SDP to generate a session protocol offer answer (answer SDP), compute a symmetric key of the server, and encrypt the answer SDP with the symmetric key of the server and then return same to the client. In some embodiments, the client 91 is configured to perform the interaction method at a client side in any one of the embodiments of the present disclosure; and the server 92 is configured to perform the interaction method at a server side in any one of the embodiments of the present disclosure.

Figure 10:
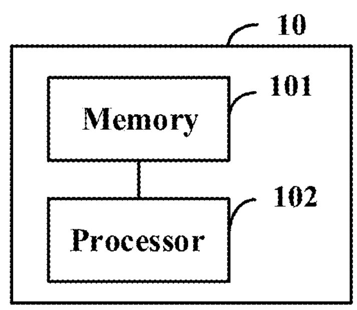
FIG. 10 is a block diagram of an interaction apparatus according to some embodiments of the present disclosure.

FIG. 10 is a block diagram of an interaction apparatus according to some embodiments of the present disclosure.

As shown in FIG. 10, an interaction apparatus 10 in this embodiment comprises: a memory 101 and a processor 102 coupled to the memory 101, where the processor 102 is configured to perform the interaction method in any one of the embodiments of the present disclosure based on instructions stored in the memory 101.

The memory 101 may comprise, for example, a system memory, a fixed non-volatile storage medium, etc. The system memory stores, for example, an operating system, an application, a boot loader, a database, and other programs.

Figure 11:
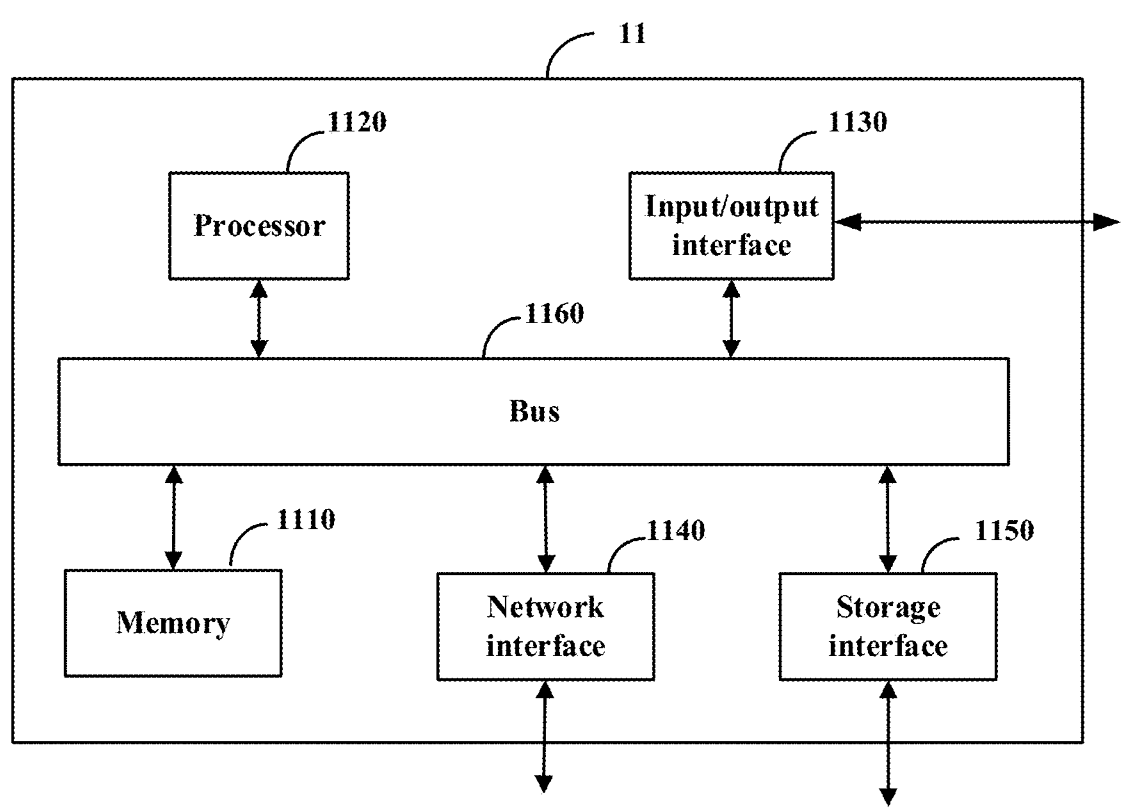
FIG. 11 is a block diagram of an interaction apparatus according to some other embodiments of the present disclosure.

FIG. 11 is a block diagram of an interaction apparatus according to some other embodiments of the present disclosure.

As shown in FIG. 11, an interaction apparatus 11 in this embodiment comprises: a memory 1110 and a processor 1120 coupled to the memory 1110, where the processor 1120 is configured to perform the interaction method in any one of the foregoing embodiments based on instructions stored in the memory 1110.

The memory 1110 may comprise, for example, a system memory, a fixed non-volatile storage medium, etc. The system memory stores, for example, an operating system, an application, a boot loader, and other programs.

The interaction apparatus 11 may also comprise an input/output interface 1130, a network interface 1140, a storage interface 1150, etc. These interfaces 1130, 1140, and 1150, and the memory 1110 and the processor 1120 may be connected to each other via a bus 1160, for example. The input/output interface 1130 provides a connection interface for an input/output device such as a display, a mouse, a keyboard, a touch screen, a microphone, and a loudspeaker box. The network interface 1140 provides a connection interface for various networking devices. The storage interface 1150 provides a connection interface for an external storage device such as an SD card and a USB flash drive.

Figure 12A:
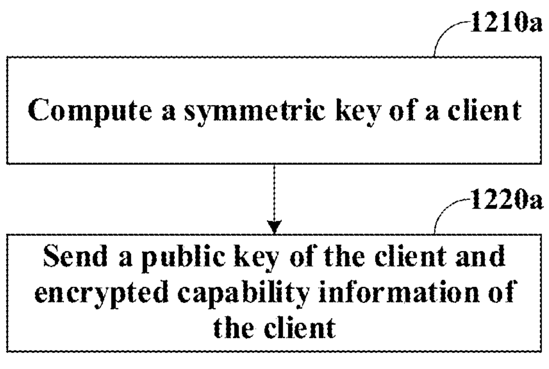
FIG. 12a to FIG. 12c are flowcharts of an interaction method according to some embodiments of the present disclosure.

FIG. 12*a* is a flowchart of an interaction method according to some embodiments of the present disclosure.

As shown in FIG. 12*a*, the interaction method is performed by a client. In step 1210*a*, a symmetric key of the client is computed. In step 1220*a*, a public key of the client and capability information of the client that is encrypted with the symmetric key of the client are sent to a server.

In some embodiments, the interaction method further comprises: in the case of an initial connection between the client and the server, asking the server for a first public key of the server; and receiving the first public key of the server that is returned by the server, where the first public key is configured to compute the symmetric key of the client.

In some embodiments, the computing the symmetric key of the client using the first public key of the server comprises: in the case of a non-initial connection between the client and the server, computing the symmetric key of the client using a saved first public key of the server.

In some embodiments, the capability information of the client comprises a mini session description protocol (miniSDP). The interaction method further comprises: compressing a session description protocol offer (offer SDP) into the miniSDP.

In some embodiments, the interaction method further comprises: receiving a second public key of the server and capability information of the server that is encrypted with a symmetric key of the server, which are returned by the server, where the symmetric key of the server is computed by the server based on the generated second public key of the server.

In some embodiments, the capability information of the server is a mini session description protocol answer (miniSDP answer), where the miniSDP answer is generated through compression of a session description protocol answer (SDP answer) by the server. The interaction method further comprises: decompressing the miniSDP answer to obtain the SDP answer.

In some embodiments, the capability information of the server is generated from media information that is found by the server by performing back-to-source of the media data based on the capability information of the client.

In some embodiments, the interaction method further comprises: in the case of the initial connection between the client and the server, verifying a certificate returned by the server.

In some embodiments, the interaction method further comprises: sending a mini session description protocol data buffer (MiniSDP data buffer) over an established quick user datagram protocol Internet connection (QUIC) channel.

In some embodiments, the computing a symmetric key of the client comprises: computing the symmetric key of the client using the first public key of the server and a private key of the client.

Figure 12B:
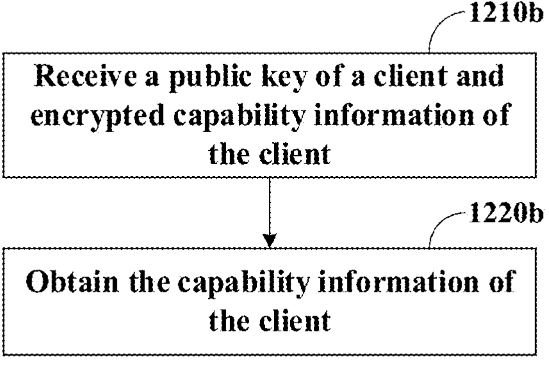

FIG. 12*b* is a flowchart of an interaction method according to some embodiments of the present disclosure.

As shown in FIG. 12*b*, the interaction method is performed by a client. In step 1210*b*, a public key of the client and capability information of the client that is encrypted with a symmetric key of the client are received from the client. In step 1220*b*, the capability information of the client is obtained.

In some embodiments, the interaction method further comprises: in the case of an initial connection between the client and the server, receiving, from the client, a query about a first public key of the server; and returning the first public key of the server to the client, where the first public key is configured to compute the symmetric key of the client.

In some embodiments, the capability information of the client is a mini session description protocol (miniSDP), where the miniSDP is generated through compression of a session description protocol offer (offer SDP) by the client. The interaction method further comprises: decompressing the miniSDP into the offer SDP.

In some embodiments, the interaction method further comprises: returning, to the client, a second public key of the server and capability information of the server that is encrypted with a symmetric key of the server, where the symmetric key of the server is computed by the server based on the generated second public key of the server.

In some embodiments, the capability information of the server is the SDP answer, and the returning, to the client, a second public key of the server and the capability information of the server that is encrypted with a symmetric key of the server comprises: compressing the SDP answer into a miniSDP answer; and returning, to the client, the encrypted miniSDP answer to the client, so that the client can decompress the miniSDP answer to obtain the SDP answer.

In some embodiments, the interaction method further comprises: performing back-to-source of the media data based on the capability information of the client, to find media information; and generating the capability information of the server based on the media information.

In some embodiments, the interaction method further comprises: in the case of the initial connection between the client and the server, returning a certificate to the client for verification of the certificate by the client.

In some embodiments, the interaction method further comprises: over an established QUIC channel, receiving a MiniSDP data buffer sent by the client.

In some embodiments, the symmetric key of the client is computed by the client using the first public key of the server and a private key of the client.

In some embodiments, the capability information of the server is generated through compression of the session description protocol answer (SDP answer), and the returning, to the client, a second public key of the server and the capability information of the server that is encrypted with a symmetric key of the server comprises: compressing the SDP answer into the capability information of the server; and returning the encrypted capability information of the server to the client.

In some embodiments, the capability information of the server comprises a mini session description protocol answer (miniSDP answer).

In some embodiments, the session description protocol offer (offer SDP) is compressed into the capability information of the client.

In some embodiments, the capability information of the client comprises a mini session description protocol (miniSDP).

Figure 12C:
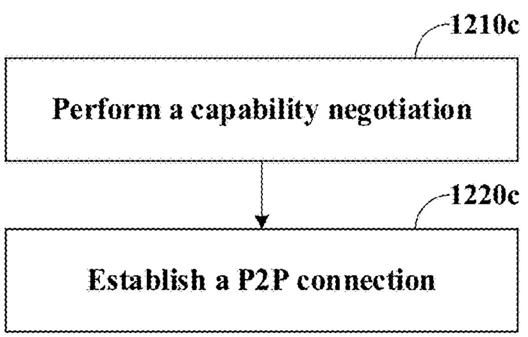

FIG. 12*c* is a flowchart of an interaction method according to some embodiments of the present disclosure.

As shown in FIG. 12*c*, for example, when the interaction method is performed by a server, the interaction method comprises the following steps. In step 1210*c*, a media capability negotiation is performed with a client according to a QUIC protocol. In step 1220*c*, a peer-to-peer (P2P) media transport channel is established with the client for transmission of media data with the client through the P2P media transport channel. In some embodiments, the P2P connection is established by means of an ICE protocol for transmission of the media data. In some embodiments, the performing the media capability negotiation with the client according to the quick user datagram protocol Internet connection (QUIC) protocol comprises: receiving, from the client, a public key of the client and capability information of the client that is encrypted with a symmetric key of the client; and obtaining the capability information of the client.

For example, when the interaction method is performed by a client, the interaction method comprises the following steps. In step 1210*c*, a media capability negotiation is performed with a server according to a QUIC protocol. In step 1220*c*, a peer-to-peer (P2P) media transport channel is established with the client for transmission of media data with the client through the P2P media transport channel. In some embodiments, the P2P connection is established by means of an ICE protocol for transmission of the media data. In some embodiments, the performing the media capability negotiation with the server according to the quick user datagram protocol Internet connection (QUIC) protocol comprises: computing a symmetric key of the client; and sending, to the server, a public key of the client and capability information of the client that is encrypted with the symmetric key of the client.

According to still other embodiments of the present disclosure, there is provided an interaction system. The system comprises: a client configured to perform the interaction method at a client side in any one of the foregoing embodiments; and a server configured to perform the interaction method at a server side in any one of the foregoing embodiments.

It should be understood by those skilled in the art that the embodiments of the present disclosure can be provided as a method, a system, or a computer program product. Accordingly, the present disclosure may take the form of an entirely hardware embodiment, an entirely software embodiment, or an embodiment combining software and hardware aspects. Furthermore, the present disclosure may take the form of a computer program product that is implemented on one or more computer-usable non-transitory storage media (comprising, but not limited to, a disk memory, a CD-ROM, an optical memory, etc.) that comprise computer-usable program code.

So far, the present disclosure has been described in detail. In order to avoid obscuring the concept of the present disclosure, some details well known in the art are not described. Based on the above description, those skilled in the art can fully understand how to implement the technical solutions disclosed here.

The method and system of the present disclosure may be implemented in many ways. For example, the method and system of the present disclosure may be implemented in software, hardware, firmware, or any combination of software, hardware, and firmware. The above order of the steps of the method is only for illustration, and unless otherwise specifically stated, the steps of the method of the present disclosure are not limited to the order specifically described above. In addition, in some embodiments, the present disclosure may also be implemented as a program recorded in a recording medium, where the program comprises machine-readable instructions for implementing the method according to the present disclosure. Therefore, the present disclosure also covers a recording medium storing a program for executing the method according to the present disclosure.

While some specific embodiments of the present disclosure have been exemplarily described in detail, it should be understood by those skilled in the art that the above examples are merely for illustration and are not intended to limit the scope of the present disclosure. Those skilled in the art should understand that various modifications can be made to the above embodiments, without departing from the scope and spirit of the present disclosure. The scope of the present disclosure is defined by the appended claims.

What is claimed is:

1. An interaction method, which is performed by a server, the method comprising:

performing a media capability negotiation with a client according to a quick user datagram protocol Internet connection (QUIC) protocol; and establishing a peer-to-peer (P2P) media transport channel with the client for transmission of media data with the client through the P2P media transport channel, wherein the performing the media capability negotiation with the client according to the quick user datagram protocol Internet connection (QUIC) protocol comprises:

receiving, from the client, capability information of the client, the capability information of the client is generated through compression of a session description protocol offer (offer SDP) by the client.

2. The interaction method according to claim 1, wherein the performing the media capability negotiation with the client according to the quick user datagram protocol Internet connection (QUIC) protocol comprises:

receiving, from the client, a public key of the client and the capability information of the client that is encrypted with a symmetric key of the client; and obtaining the capability information of the client.

3. The interaction method according to claim 1, further comprising:

receiving, from the client, a query about a first public key of the server, in response to an initial connection between the client and the server; and returning the first public key of the server to the client, wherein the first public key is configured to compute a symmetric key of the client.

4. The interaction method according to claim 1, further comprising:

decompressing the capability information of the client into the offer SDP.

5. The interaction method according to claim 1, wherein the capability information of the client comprises a mini session description protocol (miniSDP).

6. The interaction method according to claim 1, further comprising:

returning, to the client, a second public key of the server and capability information of the server that is encrypted with a symmetric key of the server, wherein the symmetric key of the server is computed by the server based on the generated second public key of the server.

7. The interaction method according to claim 6, wherein the returning, to the client, the second public key of the server and the capability information of the server that is encrypted with the symmetric key of the server comprises:

compressing a session description protocol answer (SDP answer) into the capability information of the server; and returning an encrypted capability information of the server to the client.

8. The interaction method according to claim 7, wherein the capability information of the server comprises a mini session description protocol answer (miniSDP answer).

9. The interaction method according to claim 1, further comprising:

performing back-to-source of the media data based on the capability information of the client, to find the media information; and generating capability information of the server based on the media information.

10. The interaction method according to claim 2, wherein the symmetric key of the client is computed by the client using a first public key of the server and a private key of the client.

11. The interaction method according to claim 1, further comprising:

returning a certificate to the client for verification of the certificate by the client, in response to an initial connection between the client and the server.

12. The interaction method according to claim 1, further comprising:

receiving a mini session description protocol data buffer (MiniSDP data buffer) sent by the client, over an established quick user datagram protocol Internet connection (QUIC) channel.

13. The interaction method according to claim 1, wherein the establishing the peer-to-peer (P2P) media transport channel with the client for the transmission of the media data with the client through the P2P media transport channel comprises:

establishing the P2P media transport channel by means of an interactive connection establishment (ICE) protocol for the transmission of the media data.

14. An interaction method, which is performed by a client, the method comprising:

performing a media capability negotiation with a server according to a quick user datagram protocol Internet connection (QUIC) protocol; and establishing a peer-to-peer (P2P) media transport channel with the client for transmission of media data with the client through the P2P media transport channel, wherein the performing the media capability negotiation with the server according to the quick user datagram protocol Internet connection (QUIC) protocol comprises:

sending, to the server, capability information of the client, and the capability information of the client is generated through compression of a session description protocol offer (offer SDP) by the client.

15. The interaction method according to claim 14, wherein the performing the media capability negotiation with the server according to the quick user datagram protocol Internet connection (QUIC) protocol comprises:

computing a symmetric key of the client; and sending, to the server, a public key of the client and the capability information of the client that is encrypted with the symmetric key of the client.

16. An interaction system, comprising:

a client configured to perform an interaction method comprising: performing a media capability negotiation with a server according to a quick user datagram protocol Internet connection (QUIC) protocol; and establishing a peer-to-peer (P2P) media transport channel with the client for transmission of media data with the client through the P2P media transport channel; and the server configured to perform an interaction method comprising: performing the media capability negotiation with the client according to the QUIC protocol; and establishing the P2P media transport channel with the client for the transmission of the media data with the client through the P2P media transport channel, wherein the client is configured to send, to the server, capability information of the client, the server is configured to receive, from the client, the capability information of the client, and the capability information of the client is generated through compression of a session description protocol offer (offer SDP) by the client.

17. An interaction apparatus, comprising:

a memory; and a processor coupled to the memory, wherein the processor is configured to perform the interaction method according to claim 1 based on instructions stored in the memory.

18. An interaction apparatus, comprising:

a memory; and a processor coupled to the memory, wherein the processor is configured to perform the interaction method according to claim 14 based on instructions stored in the memory.

19. A non-volatile computer-readable storage medium having a computer program stored thereon, wherein when the program is executed by a processor, the interaction method according to claim 1.

20. A non-volatile computer-readable storage medium having a computer program stored thereon, wherein when the program is executed by a processor, the interaction method according to claim 14.

* * * * *